(12) United States Patent
Denney et al.

(10) Patent No.: US 8,156,372 B2
(45) Date of Patent: Apr. 10, 2012

(54) POWER OUTAGE OPERATION OF A CABLE MODEM

(75) Inventors: Lisa Voigt Denney, Suwanee, GA (US); Roger W. Fish, Superior, CO (US); Margo Dolas, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 340 days.

(21) Appl. No.: 12/351,452

(22) Filed: Jan. 9, 2009

(65) Prior Publication Data
US 2010/0180139 A1 Jul. 15, 2010

(51) Int. Cl.
*G06F 11/00* (2006.01)
(52) U.S. Cl. .......................................... 714/14
(58) Field of Classification Search ....................... 714/14
See application file for complete search history.

(56) References Cited

U.S. PATENT DOCUMENTS

| | | | | |
|---|---|---|---|---|
| 2004/0057576 | A1* | 3/2004 | Lavaud et al. | 379/413 |
| 2005/0232294 | A1* | 10/2005 | Quigley et al. | 370/436 |
| 2008/0018427 | A1* | 1/2008 | Ezra et al. | 340/7.32 |
| 2008/0151823 | A1* | 6/2008 | Quigley et al. | 370/329 |

* cited by examiner

*Primary Examiner* — Bryce Bonzo
(74) *Attorney, Agent, or Firm* — Sterne, Kessler, Goldstein & Fox PLLC

(57) ABSTRACT

A method, system and computer program product for operation of a cable modem in response to Alternating Current (AC) power outage is described herein. When a loss of AC power is detected, the cable modem is switched to battery backup mode of operation using a single upstream and a single downstream channel. This switch occurs prior to receiving instructions from a cable modem termination system to use a single upstream and a single downstream channel. The cable modem notifies the cable modem termination system of the switch to battery backup mode of operation.

46 Claims, 11 Drawing Sheets

604

| EH Element Fields | Usage | | Size |
|---|---|---|---|
| EH_TYPE | Service Flow EH_TYPE = 6 | | 4 bits |
| EH_LEN | Length of EH_VALUE = 2 | | 4 bits |
| EH_VALUE | 0 | Indicates no payload header suppression on current packet. | 8 bits (always present) |
| | 1-254 | Payload Header Suppression Index (PHSI) | |
| | Queue Indicator | | 1 bit |
| | Active Grants | | 7 bits |

Dynamic Bonding Change Request

POWER OUTAGE OPERATION OF A CABLE MODEM

BACKGROUND OF THE INVENTION

1. Field of the Invention

The present invention generally relates to cable modem systems.

2. Background Art

Data Over Cable Service Interface Specification (DOCSIS) is a standard for cable modem interfaces. DOCSIS defines the communications and operation support interface requirements for data over cable networks. It permits the addition of high-speed data transfer to an existing cable TV (CATV) systems. It is employed by many cable television providers to provide Internet access over networks such as Hybrid Fiber Coaxial (HFC) networks.

DOCSIS version 3.0 introduces the concept of bonded channels in both the upstream and downstream directions. With multiple upstream and downstream channels, the power consumption by a cable modem has increased significantly. The increased power consumption exerts extra load on a battery-backup system of a cable modem in the event of Alternating Current (AC) power loss. Methods and systems are needed to prolong usage of the available battery-backup system in the event of AC power outage.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
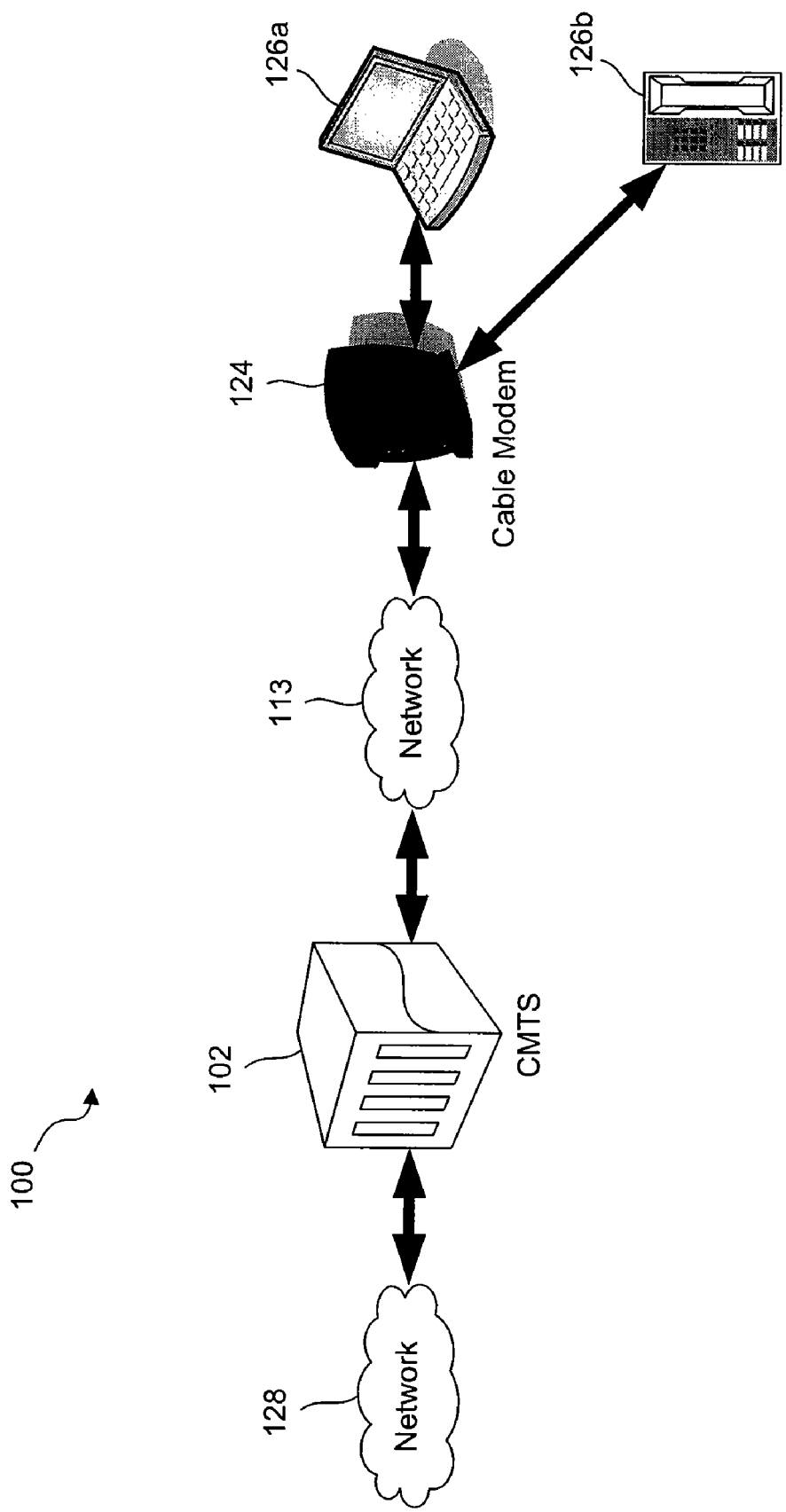
FIG. 1 illustrates an example communications system according to an embodiment of the invention.

The present invention will now be described with reference to the accompanying drawings. In the drawings, like reference numbers indicate identical or functionally similar elements. Additionally, the left-most digit(s) of a reference number may identify the drawing in which the reference number first appears.

DETAILED DESCRIPTION

Overview

Embodiments presented herein provide a method, system and computer program product for operation of a cable modem in response to Alternating Current (AC) power outage. Embodiments presented herein enable a cable modem to detect loss of AC power, switch to battery backup mode of operation and use a single upstream and downstream channel prior to receiving instructions from a cable modem termination system to reduce the number of upstream and downstream channels. One or more notifications are sent to the cable modem termination system of the switch to battery backup mode of operation. The notifications may include the upstream channel in use by the cable modem. It is to be appreciated by a person of skill in the art that even though embodiments are described with reference to a DOCSIS communications system, embodiments presented herein may be used accordingly in any communications system implementing any type of communications protocol.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example DOCSIS System Architecture

A DOCSIS communications system includes two primary components: a Cable Modem (CM) located at the customer premises, and a Cable Modem Termination System (CMTS) located at the Cable Television (CATV) headend.

The customer personal computer and associated peripherals are termed Customer Premise Equipment (CPE). Customer premise equipment are connected to the cable modem, which is in turn connected through a network (such as an HFC network) to the Cable Modem Termination System (CMTS). The cable modem termination system routes traffic between the network and the Internet. Using the cable modem termination system, a cable operator may control the cable modem's configuration. Cable modem configuration may be changed to adjust for varying line conditions and customer service requirements.

FIG. 1 illustrates an example DOCSIS communications system 100 according to an embodiment of the invention. System 100 includes network 128, Cable Modem Termination System (CMTS) 102, cable network 113, Cable Modem (CM) 124, and Customer Premises Equipment (CPE) 126.

Network 128 may be the Internet, a wide area network and/or local area network. In an embodiment, network 128 is an Ethernet network. Cable network 113 may be a Hybrid Fiber-Coaxial (HFC) network that incorporates both optical fiber along with coaxial cable to create a broadband network. In an HFC network an optical node converts optical signals to electrical signals and vice versa.

CMTS 102 performs DOCSIS headend protocol functions including but not limited to DOCSIS Media Access Control (MAC) functions. DOCSIS functions include signaling, downstream bandwidth scheduling and DOCSIS framing. CMTS 102 provides a data path for DOCSIS frames and a control path for setting up, maintaining and terminating data transfer sessions.

Cable modem 124 is equipment at an end user's premises for conveying data communications on a cable television system to/from CMTS 102 and customer premise equipment 126. Customer premise equipment 126 is at an end user's premises to enable an end user to communicate over the cable network. Customer premise equipment 126 is typically a personal computer 126a and/or a telecommunications device like a phone 126b.

Exemplary Cable Modem

Figure 2A:
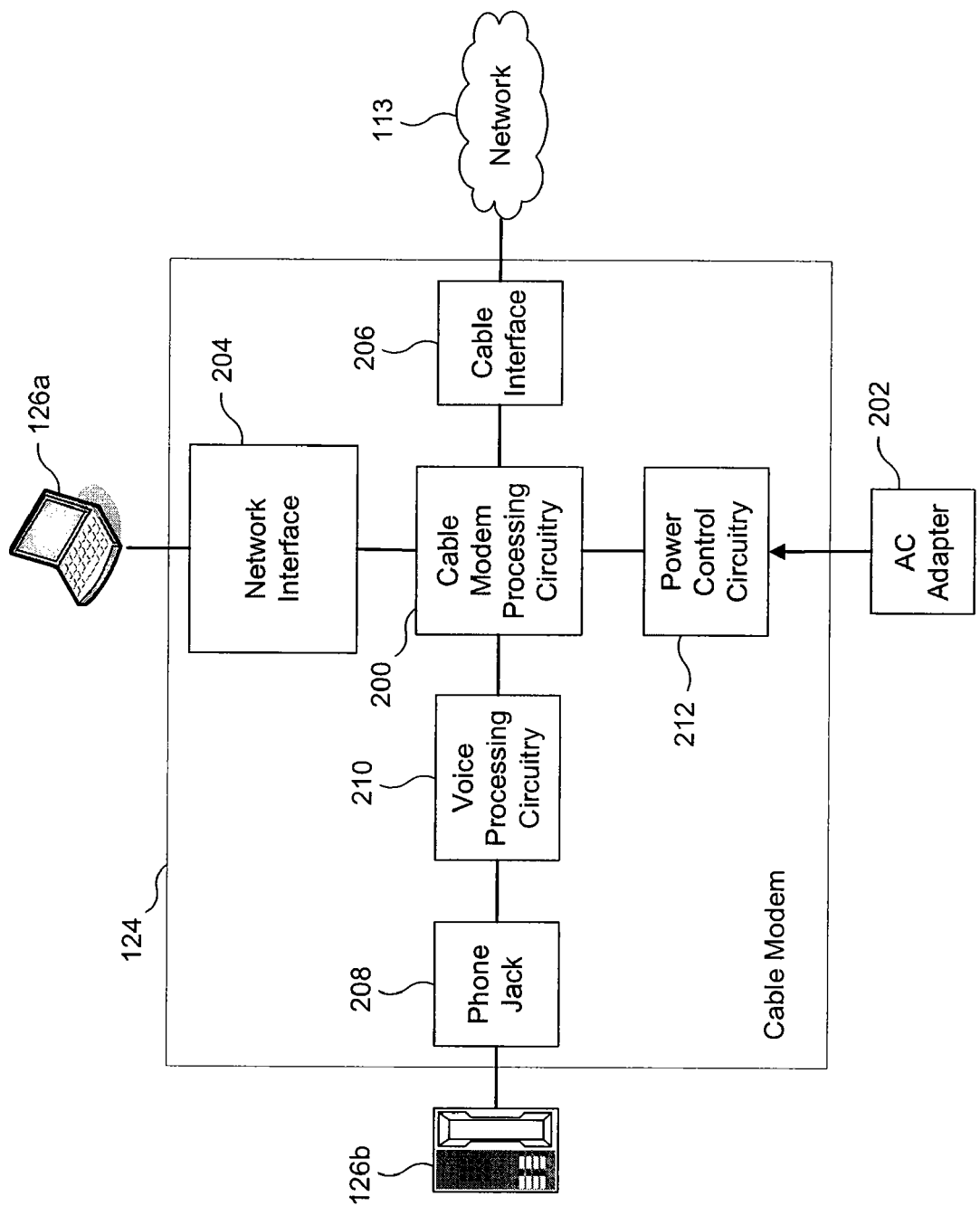
FIG. 2A illustrates an exemplary cable modem according to an embodiment of the invention.

FIG. 2A illustrates an exemplary cable modem 124 according to an embodiment of the invention. Modem 124 includes cable modem processing circuitry 200, voice processing circuitry 210, phone jack 208, cable interface 206, optional network interface 204 and power control circuitry 212.

AC adapter 202 is coupled to power control circuitry 212 of cable modem 124. Telecommunications device 126b is coupled to phone jack 208. Phone jack 208 may be an RJ-11 phone jack. Cable modem 124 is coupled to network 113 via cable interface 206. Cable interface 206 may be a coaxial cable interface. Computer 126a is coupled to network interface 204. Network interface 204 may be one of a Local Area Network (LAN), Wide Area Network (WAN), Universal Serial Bus (USB), Ethernet or Peripheral Component Interconnect (PCI) interface. In an embodiment, one or more cable modem 124 components, for example processing circuitry 200, voice processing circuitry 210 and power control circuitry 212, are on a single chip, for example, System on Chip (SoC) 800 (see FIG. 8). In alternate embodiments, components of cable modem 124 may be distributed on different chips.

Voice processing circuit 210 is configured to receive an analog voice signal from telephone 126b via phone jack 208. Voice processing circuit is configured to sample the voice signal to form a sampled signal, digitize the sampled signal to form a digitized signal and send the digitized signal to cable modem processing circuitry 200. Cable modem processing circuitry 200 is configured to form packets from the digitized signal by partitioning the digitized signal and adding DOCSIS protocol headers to the partitioned signal. Cable modem processing circuitry is also configured to convert the packets to a format suitable for transmission 206 via network 113 to CMTS 102. Cable modem processing circuitry 200 is also configured to transmit to cable modem termination system 102 at the allotted time slot for the cable modem 102.

Cable modem 102 is configured to receive a packet from CMTS 102 via network 113 and cable interface 206. Cable modem processing circuitry 200 is configured to process the received packets by performing error detection and passing the packet to either computer 126a via network interface 204 or to telephone 126b via voice processing circuitry 210 for further processing. Voice processing circuitry is configured to convert a digitized signal in the packets to an analog signal and vice versa. Cable modem 124 may also be configured to function as an Internet Protocol (EP) phone by transmitting digitized voice packets directly to computer 126a. The present example of cable modem 124 includes voice modem capabilities, however it is to be appreciated by a person of ordinary skill in the art that the embodiments presented herein apply to all types of cable modems.

Power control circuitry is configured to regulate the power supply for the cable modem 124 and to switch the power supply from AC power to a backup battery power during a power outage as further described below with reference to FIG. 2B.

Exemplary Cable Modem Power Control Circuitry

Figure 2B:
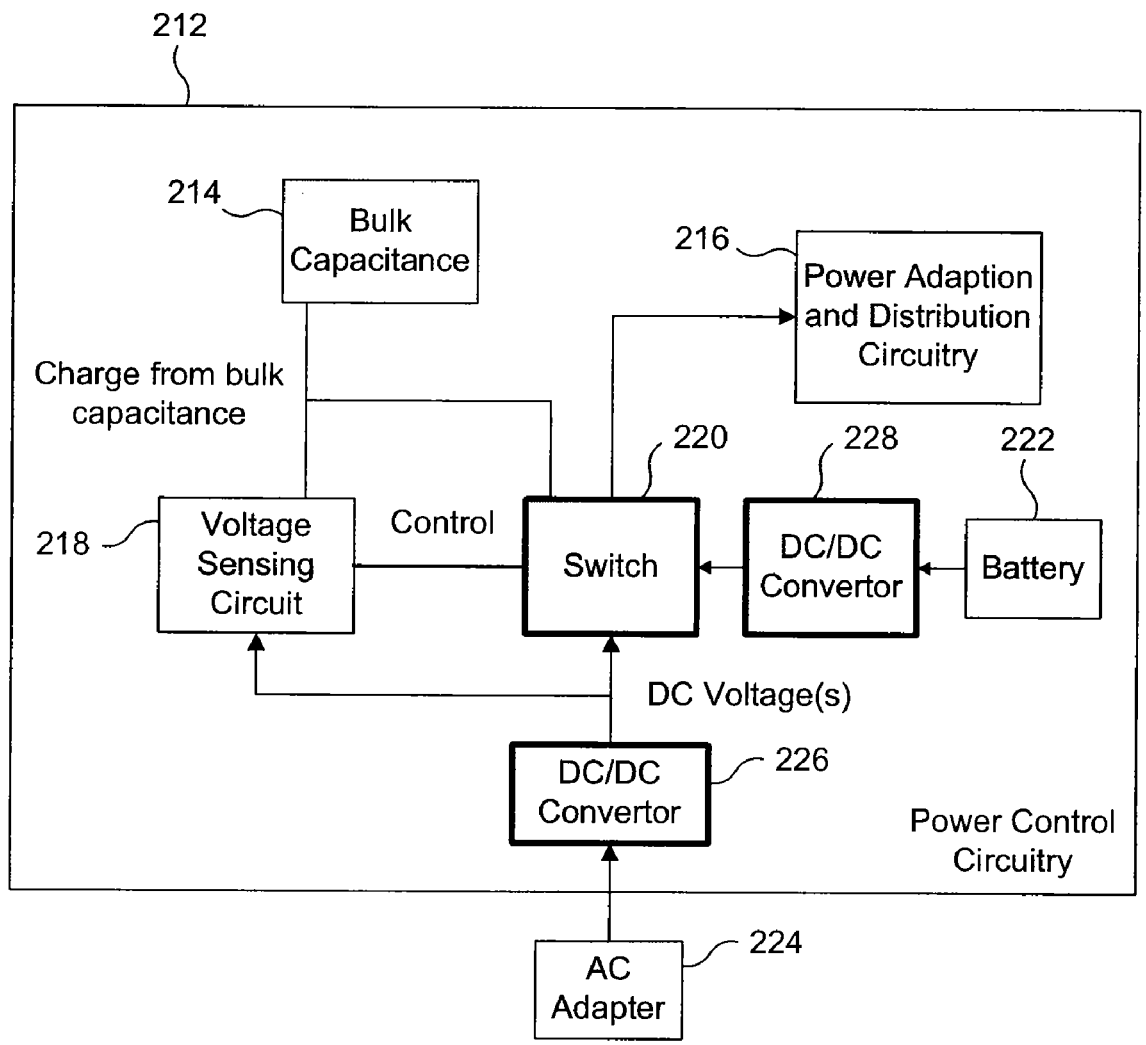
FIG. 2B illustrates exemplary power control circuitry of a cable modem according to an embodiment of the invention.

FIG. 2B illustrates exemplary power control circuitry according to an embodiment of the invention.

Power control circuitry 212 comprises voltage sensing circuit 218, DC/DC converter 226, DC/DC converter 228, switch 220, bulk capacitance 214, battery 222 and power adaptation and distribution circuitry 216. AC adapter 224 is coupled to DC/DC converter 226. Switch 220 is coupled to bulk capacitance 214, AC adapter 224 via DC/DC converter 226, voltage sensing circuit 218, battery 222 via DC/DC converter 228 and to power adaptation and distribution circuitry 216. Power adaptation and distribution circuitry 216 is configured to provide DC power to all components of modem 124. In an alternate embodiment, battery 222 directly supplies the required voltage levels to switch 220 without the intermediary DC/DC converter 228.

Power supply for modem 124 is received primarily via AC adapter 224 or battery 222. When modem 124 is operating on power from AC adapter 224 using multiple upstream and downstream channels, the operational mode is referred to as "normal mode" of operation. When power supply for modem 124 is switched to battery 222, the operation mode is referred to as "battery backup mode" of operation. According to an embodiment of the invention, modem 124 is configured to communicate with cable modem termination system 102 during battery backup mode using a single upstream and single downstream channel. DC/DC converter 226 and DC/DC converter 228 are configured to step down the DC voltage received from AC adapter 224 and battery 222 respectively.

Voltage sensing circuit 218 monitors the voltage that is fed from AC adapter 224. Voltage sensing circuit 218 is also coupled to bulk capacitance 214. During normal mode of operation, voltage sensing circuit 218 is powered by AC adapter 224. If there is a drop in the voltage from AC adapter 224, then bulk capacitance is configured to provide enough voltage to the voltage sensing circuit 218 to detect the AC power loss and to send a signal to switch 220 indicating AC power loss. Switch 220 is configured to switch the power supply from AC adapter 224 to battery 222 upon receiving a control signal from voltage sensing circuit 218 indicating loss of AC power. Capacitance 214 is also configured to power switch 214 during the AC power loss until switch 220 can transfer power supply for modem 124 from AC adapter 224 to battery 222.

Operation of modem 124 during AC power loss is described further below with reference to FIGS. 3-5.

Exemplary Methods for Cable Modem Operation During AC Power Loss

Cable modems, for example cable modems supporting voice over Internet Protocol (IP), are typically configured to provide a battery for temporary backup power during power outages. In conventional modems, maintaining multiple upstream and downstream channels during AC power loss increases power consumption, thereby requiring large, expensive batteries in order to maintain bonded channel operation during power outages. Maintaining multiple upstream and downstream channels also lowers the amount of battery time available for backup operation.

In conventional systems, a cable modem notifies the cable modem termination system of a power outage and waits for the cable modem termination system to act upon the notification and command the cable modem to operate on a single upstream and downstream channel. For example, the cable modem may notify the cable modem termination system of the power outage via a cable modem (CM-STATUS) message and may wait for the cable modem termination system to take action. The recommended DOCSIS cable modem termination system action upon receiving indication of AC power outage is to initiate a Dynamic Bonding Change Request (DBC-REQ) transaction to modify the modem's channels such that it is operating on one upstream channel and one downstream channel.

However, the existing recommended DOCSIS provision has several issues. The ability to receive the notification of power outage from the cable modem may be disabled by the cable modem termination system. For example, the cable modem termination system may have disabled the CM-STATUS message and thus, may never receive a notification of AC power loss from the cable modem and cannot take the required action. Furthermore, even if the cable modem termination system receives the AC power outage notification from the cable modem, it is recommended, but not required, to initiate a DBC-REQ transaction to reconfigure the cable modem to operate on one upstream channel and one downstream channel. Additionally, the amount of time that it takes for the cable modem to send a CM-STATUS message, wait for a DBC-REQ message from the cable modem termination system, and disable the appropriate channels requires a costly amount of battery power. For example, if a large locality lost power in a storm, it could be an unacceptably long time before each voice modem in the locality received its DBC-REQ message. Even if the notification of power outage is not disabled, the amount of time it may take for cable modem termination system to configure a cable modem to have a single upstream and downstream channel for battery backup mode may drain most of the backup battery. Because the modem cannot depend on any relief from the cable modem termination system during a power outage, the cable modem may either be required to have a costly battery to support power outages by supporting multiple upstream and downstream channels or by limiting the amount of time it can supply support for multiple upstream and downstream channels.

In order to reduce the battery costs of the voice modem by reducing the size of the battery required to maintain operation of the cable modem and to prolong the amount of time the cable modem can provide services in a power outage, embodiments presented herein enable a cable modem to take pre-emptive action upon loss of AC power to reconfigure itself to operate in battery backup mode on one upstream channel and one downstream channel during the event of a power outage.

According to an embodiment of the invention, the cable modem is also configured to notify the cable modem termination system that it is operating on battery power and specify which upstream channel is in use by the cable modem. The cable modem maintains its primary downstream channel as its downstream channel in order to maintain its timing with the cable modem termination system and chooses an upstream channel on which to operate. In order to ensure that the change to a single downstream and single upstream channel would occur as quickly as possible, the cable modem communicates its status of battery back-up to the cable modem termination system by one or more messages. For example, the cable modem may send a cable modem status (CM-STATUS) message to the CMTS, the cable modem may set an indicator in subsequent ranging request (RNG-REQ) messages, and if an unsolicited grant service flow is active, the cable modem may set an indicator in a DOCSIS extended header.

In embodiments presented herein, more than one method of notification of battery backup status of the cable modem may be used to address all of the error scenarios that may prevent the cable modem termination system from receiving notification of battery backup mode of operation from the cable modem. For example, the maximum backoff time for the CM-STATUS is approximately 20 minutes; in the worst case, the cable modem would have to wait 20 minutes after the power outage to notify the cable modem termination system with the CM-STATUS message. Also, the CM-STATUS message has no return acknowledgement response from the cable modem termination system so there would be no indication of a lost message. The T4 timeout multiplier in the DOCSIS specification allows the cable modem termination system to schedule ranging opportunities to be 5 minutes apart, so in the worst case, the cable modem would wait 5 minutes after the power outage to notify the cable modem termination system by using the RNG-REQ message. The cable modem termination system would receive the indicator in the DOCSIS extended header on packets in an unsolicited grant service flow quickly; however, this notification only works if an unsolicited grant service flow is active (i.e. if a voice call is active) and the grant is on the cable modem's selected upstream channel.

When the power outage ends, the cable modem is configured to notify the cable modem termination system that it no longer operates in battery back-up mode. In an embodiment, the cable modem may not autonomously return to the channel configuration in use prior to the power outage. Instead, the cable modem may return control to the cable modem termination system, waiting for a cable modem termination system action to direct the cable modem to operate on multiple channels if the additional channels are desired.

Figure 3A:
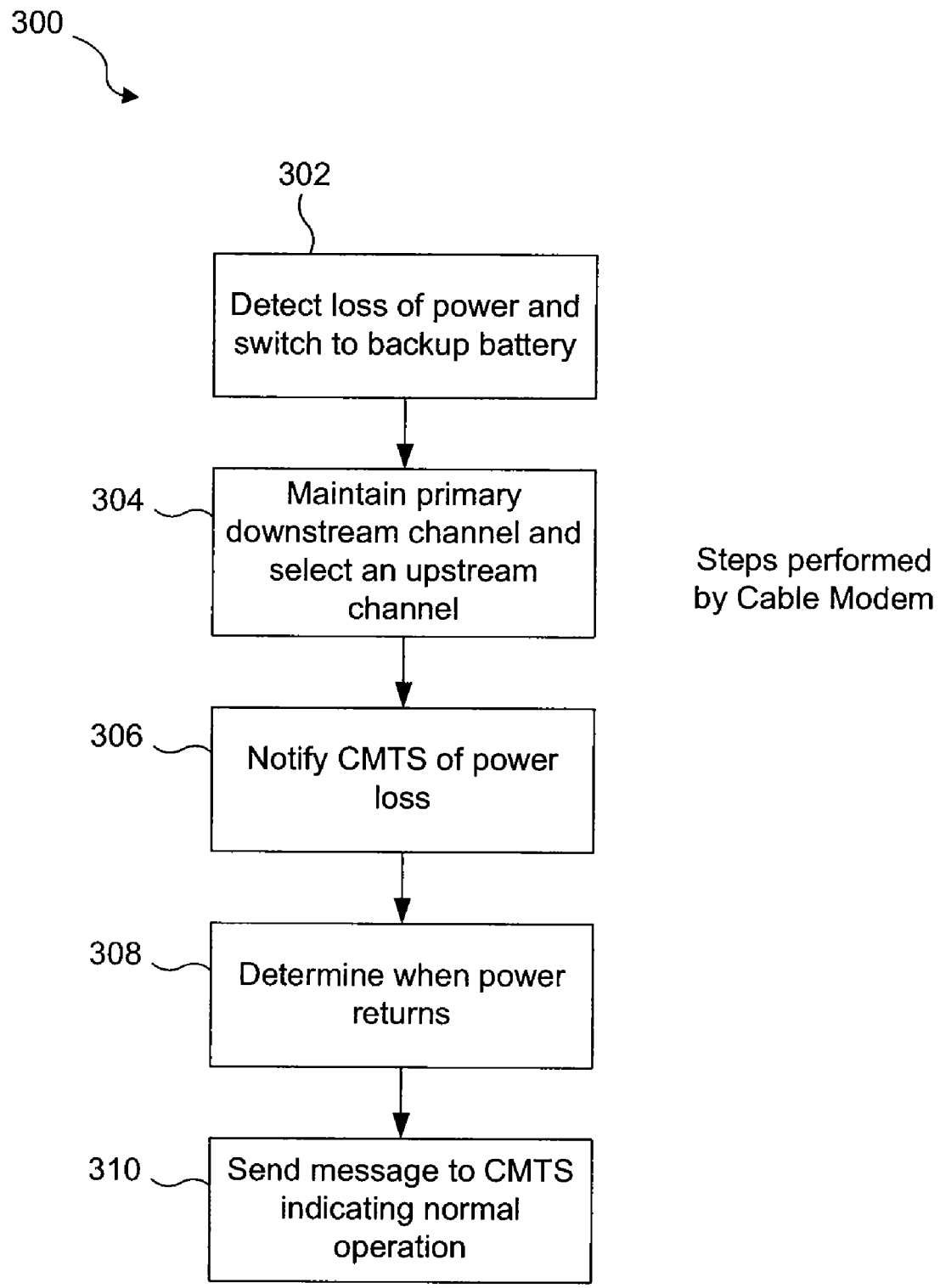
FIG. 3A shows an example flowchart illustrating steps performed by a cable modem upon detecting loss of AC power according to an embodiment of the invention.

FIG. 3A shows an example flowchart 300 illustrating steps performed by a cable modem upon detecting loss of AC power according to an embodiment of the invention. Flowchart 300 will be described with continued reference to the example operating environment depicted in FIGS. 1 and 2. However, flowchart 300 is not limited to these embodiments. Note that some steps shown in flowchart 300 do not necessarily have to occur in the order shown.

In step 302, loss of AC power is detected and power supply is switched to a backup battery. For example, voltage sensing circuit 218 in power control circuitry 212 detects loss of power from AC adapter 224 and switches power supply to backup battery 222 by sending a control signal to switch 220.

In step 304, the primary downstream channel is maintained as the downstream channel in use and an upstream channel is selected for transmission. For example, cable modem 124 maintains the primary downstream channel as the downstream channel to cable modem termination system 102 and selects one of multiple upstream channels as the primary upstream channel to cable modem termination system 102. In an embodiment, for the case of a voice modem, the upstream channel to be used for transmission is selected using the steps described below with reference to flowchart 312 in FIG. 3B.

In step 306, one or more notifications is sent indicating the loss of AC power and battery backup mode of operation. For example, cable modem 124 sends one or more notifications to cable modem termination system 102 indicating loss of AC power and battery backup mode of operation.

In an embodiment, cable modem 124 communicates battery backup mode of operation to the cable modem termination system 102 by sending a cable modem status (CM-STATUS) message. For example, cable modem 124 sends cable modem status message 602 (see FIG. 6B) to indicate loss of power and battery backup mode of operation to cable modem termination system 102 by setting a predetermined value, for example a value of 9, in an Event Type field of message 602. The cable modem status message 602 may be extended to include the upstream channel on which modem 102 is operating. The cable modem status message 602 may also be modified to disallow the cable modem termination system 102 from disabling the CM status messages with event conditions such as "Cable modem operating on battery backup" or "Cable modem returned to AC power".

Figure 6A:
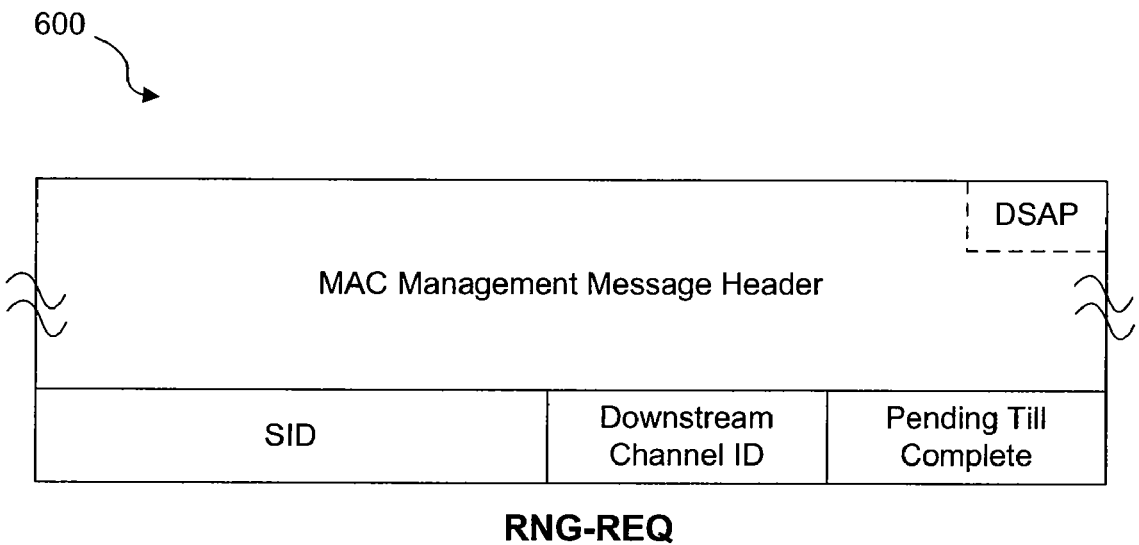
FIG. 6A is an exemplary format of a Ranging Request (RNG-REQ) message according to an embodiment of the invention.
Figure 6B:
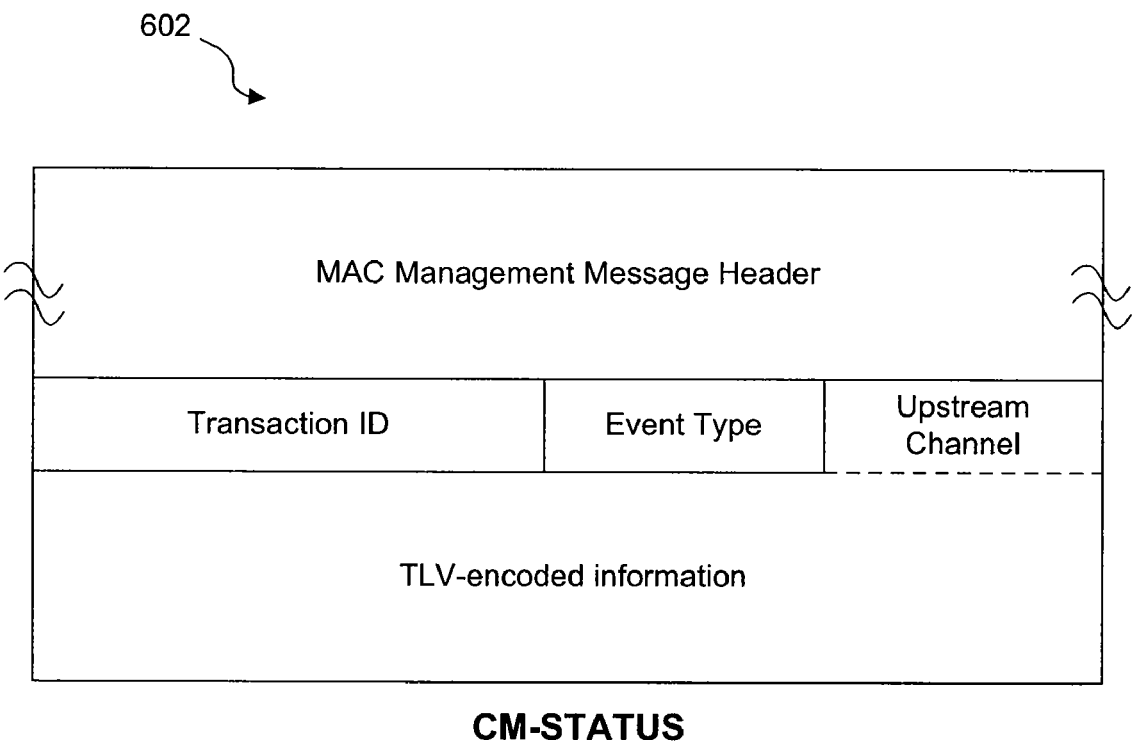
FIG. 6B is an exemplary format of a cable modem status message (CM-STATUS) according to an embodiment of the invention.

In another example, cable modem 124 sets a value in a Destination Service Access Point (DSAP) field of ranging request (RNG-REQ) message 600 illustrated in FIG. 6A to indicate that cable modem 124 has gone into battery backup mode upon loss of power and is using only one upstream and one downstream channel. In an example, cable modem 124 sets a value of 255 to indicate battery backup mode of operation, however it is to be appreciated by a person of skill in the art that the value may be arbitrary based on the protocol in use. Cable modem 124 continues to insert the value of 255 in the DSAP field of the RNG-REQ message 600 throughout the duration of AC power outage.

Figures 6C, 6D:
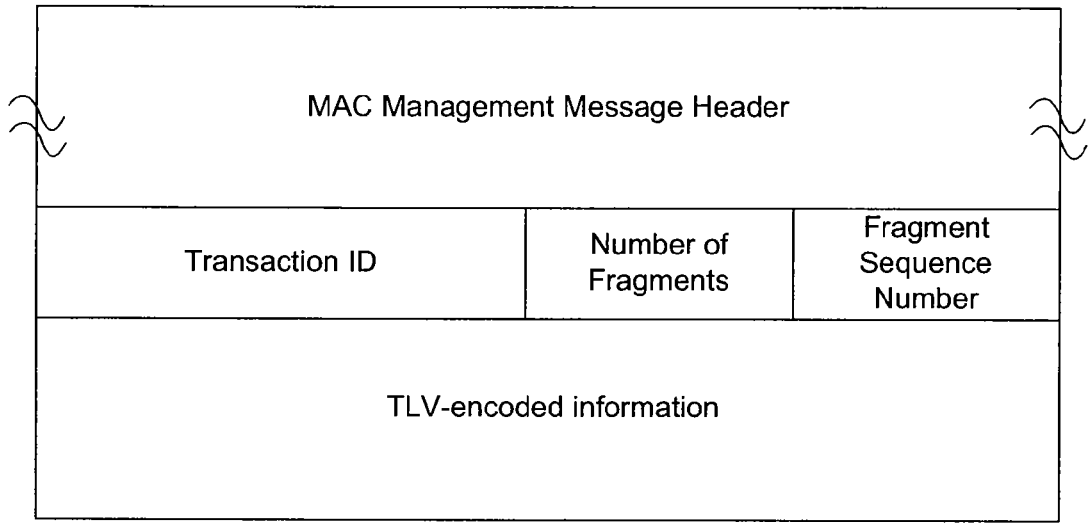
FIG. 6C is an exemplary format of an unsolicited grant synchronization extended header according to an embodiment of the invention.
FIG. 6D is an exemplary format of a Dynamic Bonding Change Request (DBC-REQ) according to an embodiment of the invention.

In yet another example, if an unsolicited grant service flow is active on the upstream channel on which the cable modem 124 has selected to transmit, then cable modem 124 sets bit six of an "active grants" field of an unsolicited grant synchronization extended header 604 illustrated in FIG. 6C to a value of one to indicate that cable modem 124 is only using this particular upstream channel on which the extended header 604 is transmitted.

Cable modem termination system 102 may determine the upstream channel utilized by cable modem 124 from the upstream channel on which the cable modem termination system 102 receives the RNG-REQ message 600, the CM-STATUS message 602 and/or the unsolicited grant synchronization extended header 604, whichever it receives first. Cable modem 124 may get an opportunity to transmit the CM-STATUS 602 prior to an opportunity to transmit the RNG-REQ message 600. Cable modem termination system 102 assumes that the cable modem 124 continues to receive traffic on its primary downstream channel.

In step 308, it is determined that AC power is available and the power supply is switched from battery backup to AC power. For example, voltage sensing circuit 218 determines that AC power is available from AC adapter 202 and switches the power supply from battery 222 to AC adapter 202 by sending a control signal to switch 220.

In step 310, a message is sent indicating return to normal operation on AC power. For example, cable modem 124 sends one or more messages to cable modem termination system 102 indicating normal operation on AC power. For example, cable modem 124 sets the value of the DSAP field of RNG-REQ message 600 to a value that indicates normal operation mode on AC power. Cable modem 102 may also send the CM-STATUS message 602 to cable modem termination system 102 to indicate that cable modem 124 has returned to normal mode of operation using AC power. For example, cable modem 102 may set a predetermined value, for example a value of 10, in the Event type field of CM-STATUS message 602 to indicate normal mode of operation using AC power. In another example, if an unsolicited grant service flow is active on the upstream channel on which the cable modem 124 was transmitting during battery backup mode, then cable modem 124 clears (sets to zero) bit six of the active grants field of the unsolicited grant synchronization extended header 604 illustrated in FIG. 6C.

Figure 3B:
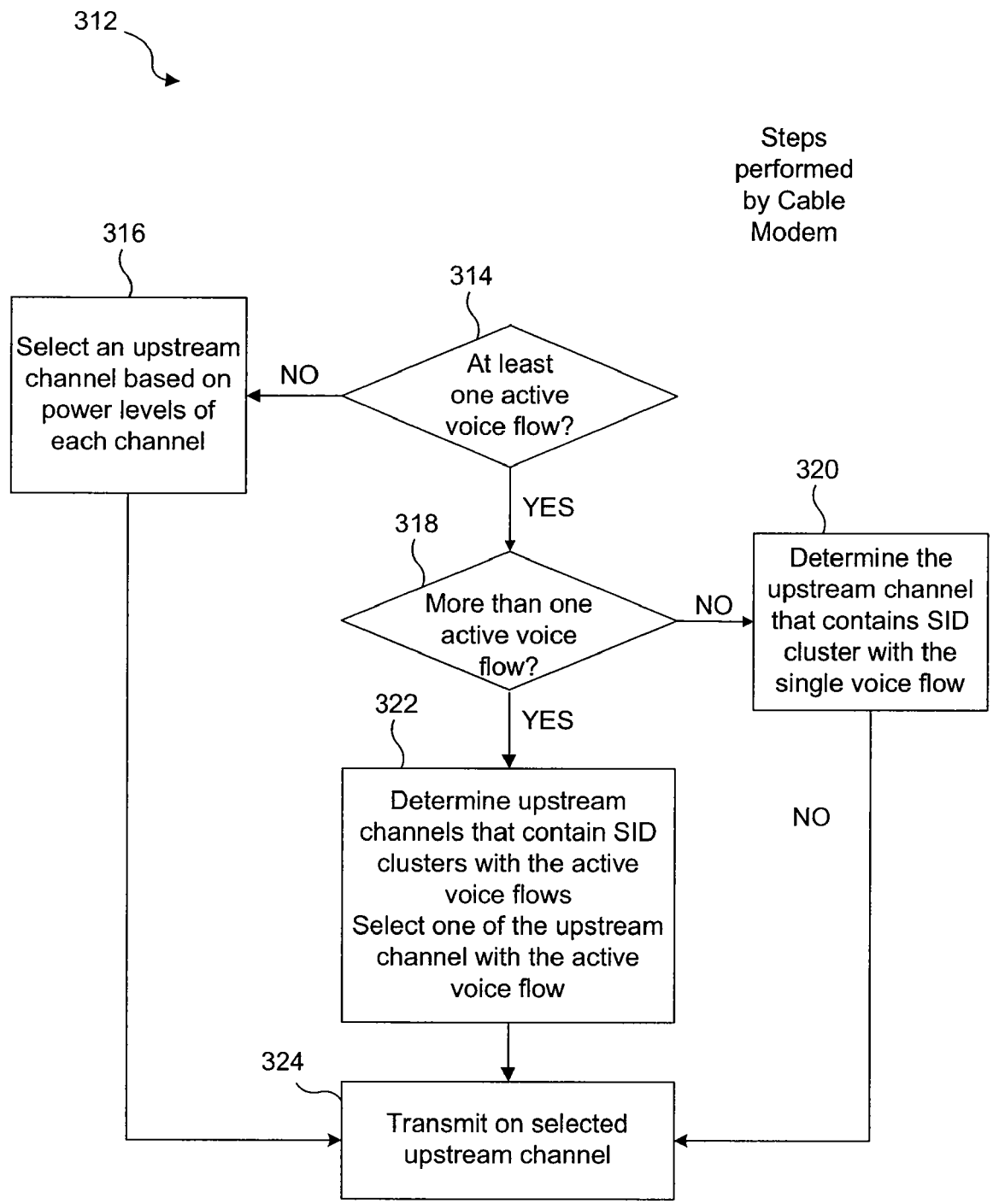
FIG. 3B shows an example flowchart illustrating steps performed by a cable modem to select an upstream channel for transmission during AC power outage according to an embodiment of the invention.

FIG. 3B is an example flowchart 312 illustrating steps performed to select an upstream channel for transmission during AC power outage and battery backup mode of operation according to an embodiment of the invention. Flowchart 312 will be described with continued reference to the example operating environment depicted in FIGS. 1 and 2. However, flowchart 312 is not limited to these embodiments. Note that some steps shown in flowchart 312 do not necessarily have to occur in the order shown.

In step 314, it is determined whether there are one or more active upstream voice flows. For example, cable modem processing circuitry 200 is configured to determine whether there is at least one active voice flow in one or more upstream channels to cable modem termination system 102.

If it is determined in step 314 that there are no active voice flows on any of the upstream channels to cable modem termination system 102, then the process proceeds to step 316. In step 316, an upstream channel for transmission to cable modem termination system 102 is selected based on power levels of the active upstream channels. For example, cable modem 124 might choose an upstream channel with the highest power levels because this channel has the power that is closest to a dynamic range window and provides the best signal fidelity. Alternatively, the cable modem might choose the upstream channel with the lowest power in order to conserve total power.

If it is determined in step 314 that there is at least one active voice flow to cable modem termination system 102, then control proceeds to step 318.

In step 318, it is determined if there is more than one active voice flows present in one or more upstream channels to cable modem termination system 102.

If it is determined in step 318, for example by processing circuitry 200, that there is only one active voice flow in one or more upstream channels to cable modem termination system 102, then the process proceeds to step 320. In step 320, cable modem processing circuitry 200 determines which upstream channel to cable modem termination system 102 includes a Service flow Identification (SID) for the active voice flow and selects that channel to be the upstream channel to cable modem termination system 102. In most cases, the active voice flow would be on a single upstream channel. If the active voice flow is on multiple upstream channels, then cable modem 124 selects one of the upstream channels with the active voice flow for transmission to cable modem termination system 124.

In step 318, if it is determined, for example by processing circuitry 200, that there are more than one active voice flows present in an upstream channel to cable modem termination system 102 then the process proceeds to step 322.

In step 322, if it is determined that there are multiple voice flows active on multiple channels then, processing circuitry 200 determines the upstream channels containing SIDs for the active voice flows. If the active voice flows are on a single upstream channel then the processing circuitry 200 selects that upstream channel. If the active voice flows are on multiple upstream channels, processing circuitry 200 selects one of the upstream channels containing an active voice flow using selection criteria, for example based on priority codes assigned to each active voice flow. In an example, processing circuitry 200 selects an upstream channel with voice flows to emergency services, for example, telephone services to the police department or fire department. This enables a user to contact emergency services when the cable modem has switched to battery backup and prior to the CMTS learning that the CM is operating in battery backup mode.

In step 324, data is transmitted on the selected upstream channel. For example, cable modem 124 transmits on the upstream channel selected in one of steps 316, 320 or 322 to cable modem termination system 102.

Figure 4:
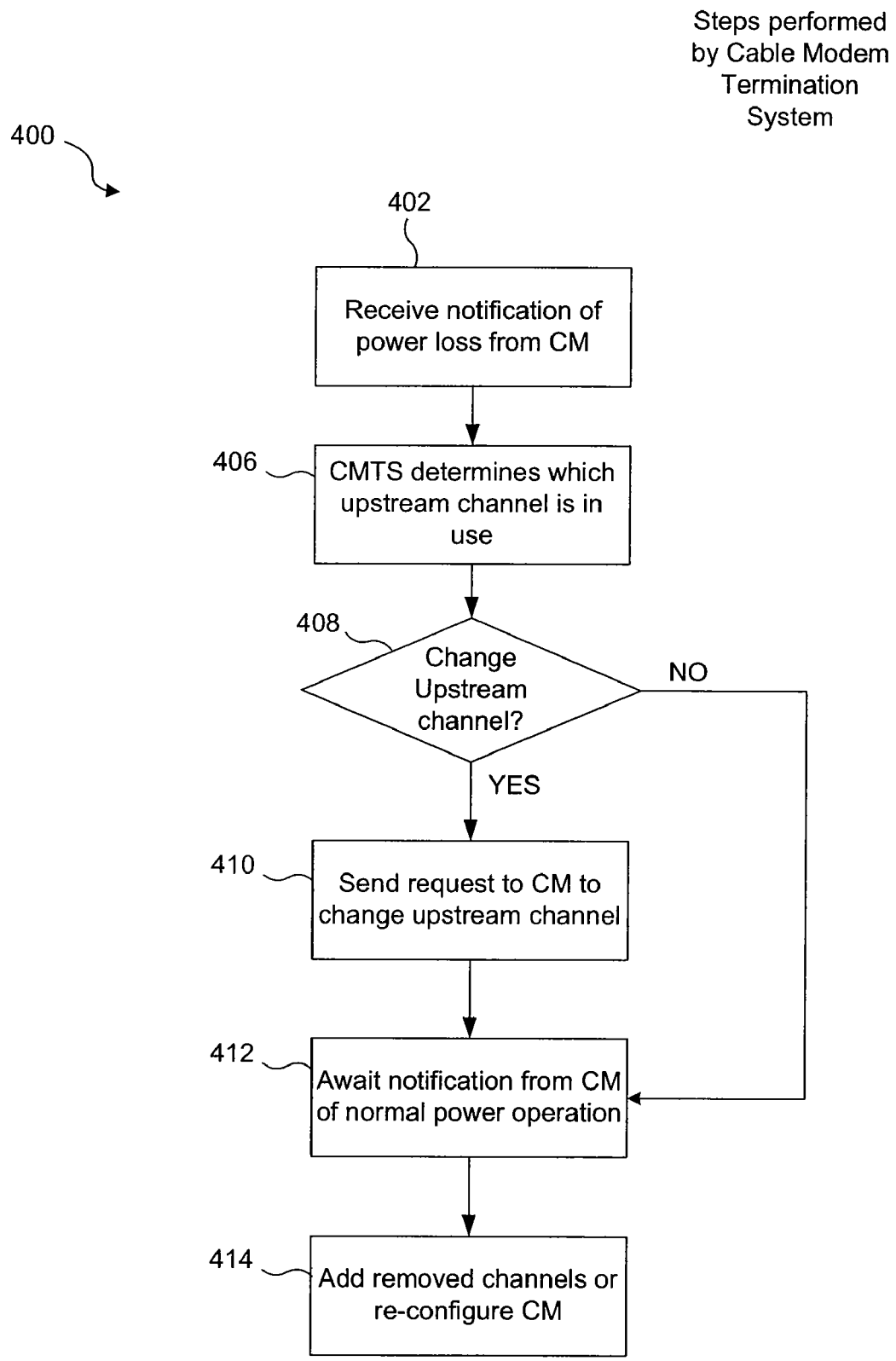
FIG. 4 shows an example flowchart illustrating steps performed by a cable modem termination system upon receiving notification from a cable modem of AC power loss according to an embodiment of the invention.

FIG. 4 illustrates an example flowchart 400 illustrating steps performed by a cable modem termination system upon receiving notification from a cable modem of AC power loss and operation in battery backup mode, according to an embodiment of the invention. Flowchart 400 will be described with continued reference to the example operating environment depicted in FIGS. 1 and 2. However, flowchart 400 is not limited to these embodiments. Note that some steps shown in flowchart 400 do not necessarily have to occur in the order shown.

In step 402, a message is received indicating loss of AC power and battery backup mode operation using one upstream channel and one downstream channel. For example, cable modem termination system 102 receives one or more messages from cable modem 124 indicating loss of AC power and battery backup operation using one upstream and one downstream channel. Cable modem termination system 102 may receive notification via one or more of CM-STATUS message 602, RNG-REQ message 600 and/or unsolicited grant synchronization extended header 604 as described above with reference to step 302 of flowchart 300.

In step 406, it is determined which upstream channel is in use. For example, cable modem termination system 102 determines which upstream channel is in use by cable modem 124 by examining a field in CM-STATUS message 602 that indicates the upstream channel in use. Alternatively, cable modem termination system 102 may determine the upstream channel in use by the cable modem based on the upstream channel on which RNG-REQ 600 or unsolicited grant synchronization extended header 604 is received.

In step 408, it is determined whether a new upstream channel is to be selected. For example, cable modem termination system 102 determines whether a different upstream channel than the one used by cable modem 102 is to be selected.

In step 408, if a new upstream channel is not to be selected than control proceeds to step 412. If a new channel is to be selected than control proceeds to step 410.

In step 410, a request is sent to change the upstream channel. For example, cable modem termination system 102 may send a Dynamic Bonding Change request (DBC-REQ) message 606 (see FIG. 6D) to cable modem 124 requesting a change in the primary upstream channel used by cable modem 124 for transmission to cable modem termination system 102. In an embodiment, while operating on battery backup mode, cable modem 124 may reject any DBC-REQ message 606 received from cable modem termination system 102 that assigns more than one downstream channel or more than one upstream channel to the cable modem 124.

In step 412, cable modem termination system awaits notification indicating normal AC power operation from the cable modem and continues to operate on a single upstream and a single downstream channel for that cable modem. For example, cable modem termination system 102 awaits notification from cable modem 124 of normal AC power operation while receiving and sending data on a single upstream and downstream channel to/from cable modem 124.

In step 414, upon receiving notification of normal AC power operation in step 412, new channels may be added or removed or cable modem may be reconfigured. For example, upon receiving one or more messages indicating normal AC power operation, cable modem termination system may add back upstream and downstream channels that were removed by cable modem 124 during the AC power outage and may reconfigure cable modem 124 to use a new set of upstream and downstream channels.

Figure 5:
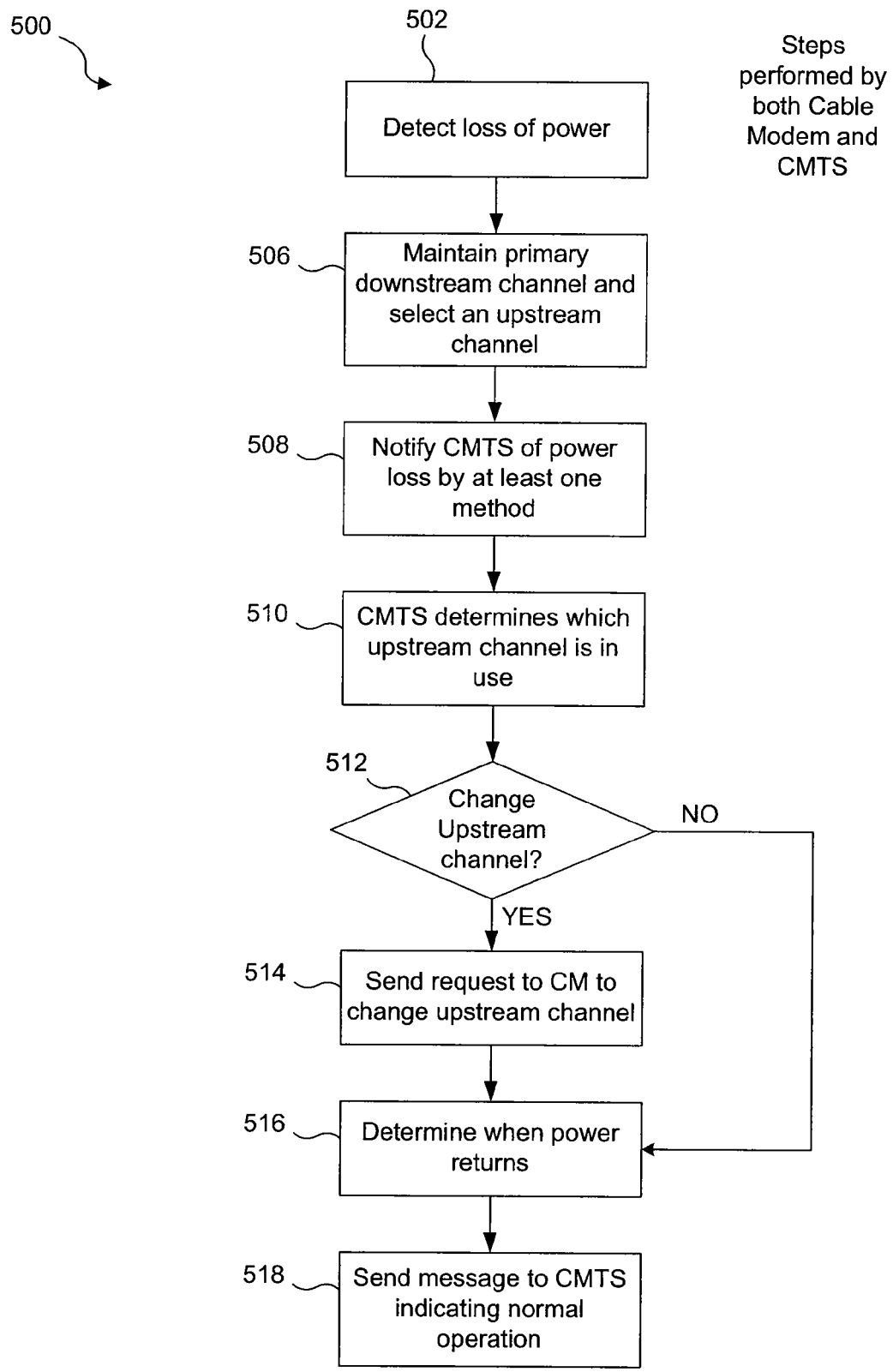
FIG. 5 illustrates a flowchart illustrating steps performed by a cable modem and a cable modem termination system during loss of AC power and battery backup operation mode according to an embodiment of the invention.

FIG. 5 illustrates a flowchart 500 illustrating steps performed by a cable modem and a cable modem termination system during loss of AC power and battery backup operation mode according to an embodiment of the invention. Flowchart 500 will be described with continued reference to the example operating environment depicted in FIGS. 1 and 2. However, flowchart 500 is not limited to these embodiments. Note that some steps shown in flowchart 500 do not necessarily have to occur in the order shown.

In step 502, loss of AC power is detected and battery backup mode operation is initiated. For example, voltage sensing circuit 218 detects loss of AC power and switches to battery backup mode using battery 222 by sending a control signal to switch 220.

In step 506, a primary downstream channel is maintained while selecting a single upstream channel for transmission. For example, cable modem 124 maintains a primary downstream channel for receiving transmissions from cable modem termination system 124 and selects an upstream channel, for example by using the steps outlined in flowchart 312 described above, for transmission to cable modem termination system 102.

In step 508, a notification is sent indicating AC power loss and battery backup mode operation. For example, cable modem 124 sends one or more messages to cable modem termination system 102 indicating loss of AC power and battery backup operation. For example, cable modem may send one or more of a CM-STATUS message 602, RNG-REQ message 600 and/or unsolicited grant synchronization extended header 604 to cable modem termination system 102 as described above with reference to step 306 of flowchart 300.

In step 510, it is determined which upstream channel is in use. For example, cable modem termination system 102 determines which upstream channel is in use by cable modem 102 for transmission by examining, for example, the upstream channel field in the header of CM-STATUS message 602 or by determining which channel the CM-STATUS message 602, RNG-REQ message 600 and/or unsolicited grant synchronization extended header 604 are received.

In step 512, it is determined whether a different upstream channel is to be selected. For example, cable modem termination system 102 determines whether a different upstream channel is to be selected.

If it is determined in step 512 that a different upstream channel is not to be selected, then the process proceeds to step 516. If a new upstream channel is to be selected, then the process proceeds to step 514.

In step 514, a request is sent to change the upstream channel in use. For example, cable modem termination system 102 sends a DBC-REQ message 606 to cable modem 102 to change the upstream channel in use by specifying a different upstream channel. As described above, cable modem 102 may reject the request, for example, if the DBC-REQ message 606 assigns more than one upstream or downstream channel to cable modem 124.

In step 516, it is determined when AC power returns and normal operation resumes. For example, voltage sensing circuit 218 determines when AC power returns and switches the power supply from battery 222 to AC adapter 224 by sending a control signal to switch 220.

In step 518, a message is sent indicating normal AC power operation. For example, upon return of AC power cable modem 124 sends a CM-STATUS message 602 and/or RNG-REQ message 600 as described in step 310 of FIG. 3A above to indicate resumption of normal AC power operation to cable modem termination system 102.

Example General Purpose Computer System

Figure 7:
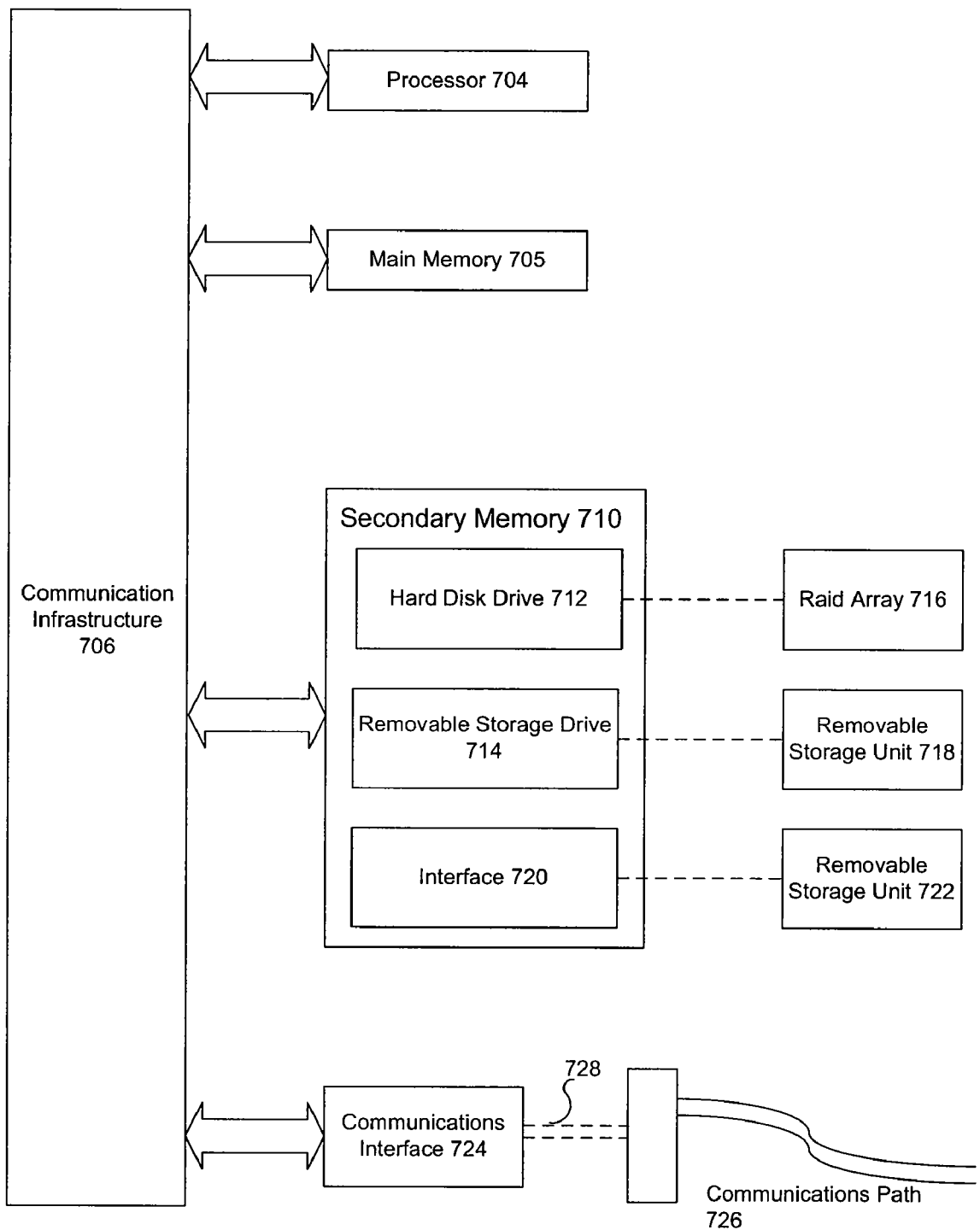
FIG. 7 is a block diagram of a computer system on which the present invention can be implemented.

The following description of a general purpose computer system can be used to implement embodiments of the invention presented herein. The present invention can be implemented in hardware, or as a combination of software and hardware. Consequently, the invention may be implemented in the environment of a computer system or other processing system. An example of such a computer system 700 is shown in FIG. 7. The computer system 700 includes one or more processors, such as processor 704. Processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

The terms "computer program medium" and "computer usable medium" are used herein to generally refer to media such as removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the processes of the present invention. For example, when executed, the computer programs enable processor 704 to implement part of or all of the steps described above with reference to FIGS. 3-5. Where the invention is implemented using software, the software may be stored in a computer program product and loaded into computer system 700 using raid array 716, removable storage drive 714, hard drive 712 or communications interface 724.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Example System on Chip

Figure 8:
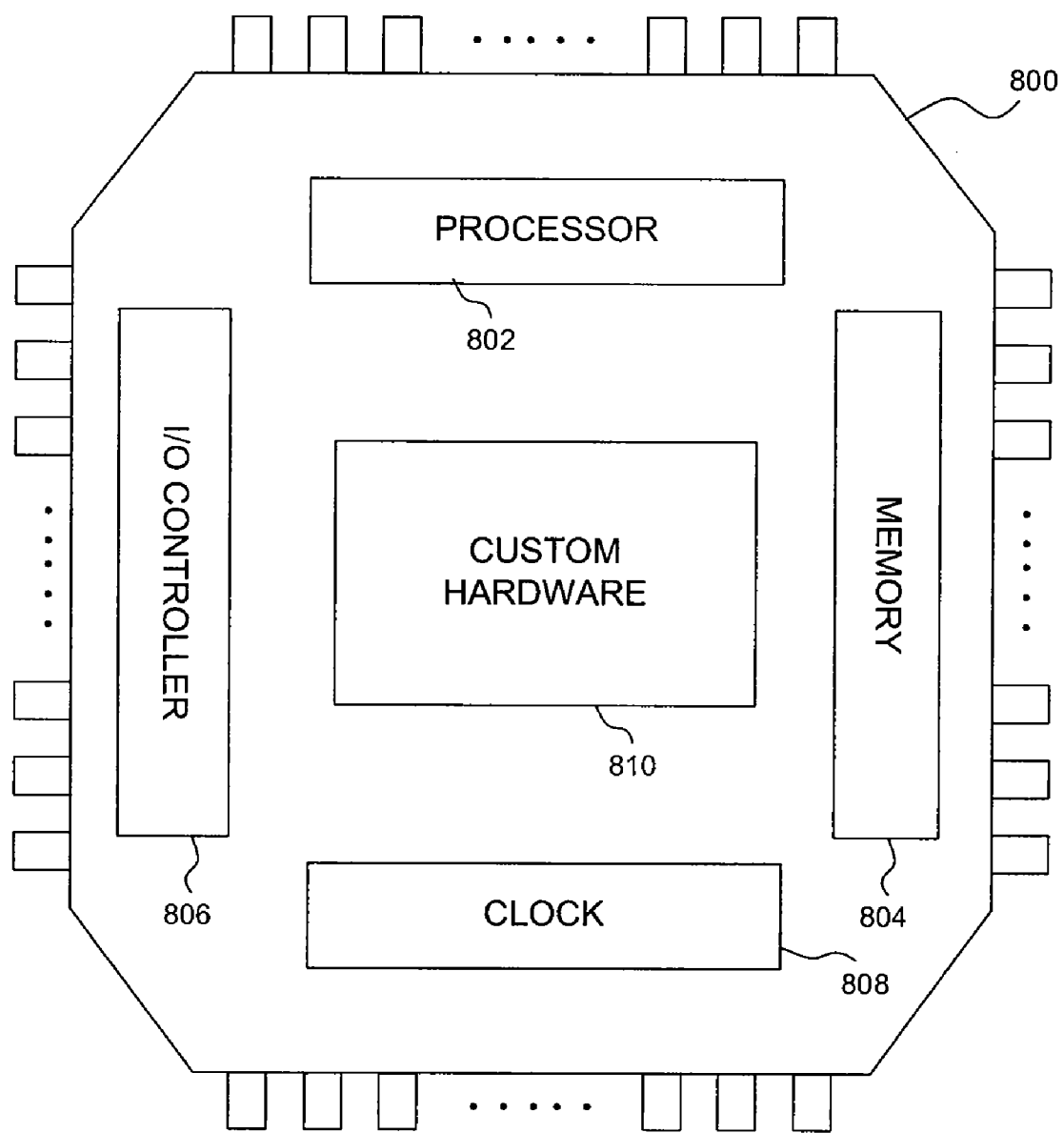
FIG. 8 is a diagram of an example System on Chip (SOC) according to an embodiment of the present invention.

FIG. 8 is a diagram of an example System on Chip (SOC) 800 according to an embodiment of the present invention. System 800 includes a processor 802, a memory 804, an input/output (I/O) controller 806, a clock 808, and custom hardware 810. In an embodiment, system 800 is in an application specific integrated circuit (ASIC). System 800 may include hardwired circuitry or a Digital Signal Processing core in the form of custom hardware 810 to implement functions of cable modem 124.

Processor 802 is any processor, for example processing circuitry 200 above, that includes features of the present invention described herein and/or implements a method embodiment of the present invention.

Memory 804 can be any memory capable of storing instructions and/or data. Memory 804 can include, for example, random access memory and/or read-only memory.

Input/output (I/O) controller 806 is used to enable components of system 800 to receive and/or send information to peripheral devices. I/O controller 806 can include, for example, an analog-to-digital converter and/or a digital-toanalog converter. For example, phone jack 208, cable interface 206 and network interface 204 may be part of I/O controller 806.

Clock 808 is used to determine when sequential subsystems of system 800 change state. For example, each time a clock signal of clock 808 ticks, state registers of system 800 capture signals generated by combinatorial logic. In an embodiment, the clock signal of clock 808 can be varied. The clock signal can also be divided, for example, before it is provided to selected components of system 800.

Custom hardware 810 is any hardware added to system 800 to tailor system 800 to a specific application. Custom hardware 810 can include, for example, hardware needed to decode audio and/or video signals, accelerate graphics operations, and/or implement a smart sensor. According to an embodiment of the invention, custom hardware 810 includes part or whole of cable modem 124 and is enabled to perform functions of cable modem 124. Persons skilled in the relevant arts will understand how to implement custom hardware 810 to tailor system 800 to a specific application.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of operation for a cable modem in response to Alternating Current (AC) power outage, comprising:
   detecting loss of AC power;
   switching to a battery backup mode of operation that uses a single upstream channel and a single downstream channel prior to receiving instructions from a cable modem termination system to switch to a single upstream channel and a single downstream channel; and
   notifying a cable modem termination system of the switch to battery backup mode of operation.

2. The method of claim 1, wherein the switching to battery backup mode step comprises:
   using a primary downstream channel for downstream transmissions; and
   selecting a single upstream channel for upstream transmissions.

3. The method of claim 2, the selecting step further comprising:
   determining whether there is at least one active voice flow present in an upstream channel; and
   if there are no active voice flows present in the upstream channels selecting the upstream channel based on channel power levels.

4. The method of claim 3, the selecting step further comprising:
   selecting an upstream channel with the highest power level.

5. The method of claim 3, the selecting step further comprising:
   selecting an upstream channel with the lowest power level.

6. The method of claim 2, the selecting step further comprising:
   determining whether there is only one active voice flow present in an upstream channel; and
   if present, selecting the upstream channel that includes a Service Flow Identification (SID) the active voice flow.

7. The method of claim 2, the selecting step further comprising:
   determining whether there are multiple active voice flows on upstream channels; and
   if multiple active voice flows are present, determining whether Service Flow Identifications (SIDs) for the active voice flows are present on more than one upstream channel;
   if SIDs for the active voice flows are on a single upstream channel, then selecting that upstream channel; and
   if SIDs for the active flows are on multiple upstream channels, then selecting one of the upstream channels.

8. The method of claim 1, the notifying step comprising:
   sending a cable modem status (CM-STATUS) message to the cable modem termination system and setting a first value in the CM-STATUS message to indicate battery backup mode of operation and a second value to indicate an upstream channel used for transmission.

9. The method of claim 1, the notifying step comprising:
   sending a ranging request (RNG-REQ) message to the cable modem termination system and setting a value in the RNG-REQ message indicating battery backup mode of operation.

10. The method of claim 1, the notifying step comprising:
    sending an unsolicited grant synchronization extended header to the cable modem termination system and setting a value in the unsolicited grant synchronization extended header indicating battery backup mode of operation.

11. The method of claim 1, further comprising detecting return of AC power.

12. The method of claim 11, further comprising switching to normal mode of operation.

13. The method of claim 12, further comprising sending a message to the cable modem termination system indicating normal mode of operation.

14. A cable modem system, comprising:
    a cable modem termination system; and
    a cable modem, coupled to the cable modem termination system, the cable modem including:
    a voltage sensing circuit configured to detect loss of AC power and to switch to battery backup mode of operation by sending a control signal to a switch to switch power supply from AC power to a battery; and
    cable modem processing circuitry configured to notify the cable modem termination system of battery backup mode of operation and to select a single upstream and a single downstream channel for communications with the cable modem termination system;
    wherein the cable modem is configured to use a single upstream and a single downstream channel prior to receiving instructions from the cable modem termination system to switch to a single upstream and a single downstream channel.

15. The system of claim 14, wherein the cable modem is configured to send a cable modem status (CM-STATUS) message to the cable modem termination system, to set a value in the CM-STATUS message to indicate battery backup mode of operation and to set a value to indicate an upstream channel in use.

16. The system of claim 14, wherein the cable modem is configured to send a ranging request (RNG-REQ) message to the cable modem termination system and to set a value in the RNG-REQ message indicating battery backup mode of operation.

17. The system of claim 14, wherein the cable modem is configured to send an unsolicited grant synchronization extended header to the cable modem termination system and to set a value in the unsolicited grant synchronization extended header indicating battery backup mode of operation.

18. The system of claim 14, wherein the cable modem processing circuitry is configured to select an upstream channel based on whether active voice flows are present on the upstream channel or based on power levels of the upstream channel if no active voice flows are present.

19. A computer program product comprising a computer useable medium including control logic stored therein, the control logic when executed by a processor causes the processor to:
  detect loss of alternating Current (AC) power;
  switch to battery backup mode of operation using a single upstream and a single downstream channel prior to receiving instructions from a cable modem termination system to switch to use a single upstream and a single downstream channel; and
  notify a cable modem termination system of the switch to battery backup mode of operation.

20. The computer program product of claim 19, further comprising control logic means for causing the processor to:
  use a primary downstream channel for downstream transmissions; and
  select a single upstream channel for upstream transmissions.

21. The computer program product of claim 20, further comprising control logic means for causing the processor to:
  select an upstream channel based on whether active voice flows are present on the upstream channel or to select an upstream channel based on channel power levels if no active voice flows are present.

22. The computer program product of claim 19, further comprising control logic means for causing the processor to:
  send a cable modem status (CM-STATUS) message to the cable modem termination system, to set a first value in the CM-STATUS message to indicate battery backup mode of operation and to set a second value indicating the upstream channel used for transmission.

23. The computer program product of claim 19, further comprising control logic means for causing the processor to:
  send a ranging request (RNG-REQ) message to the cable modem termination system and to set a value in the RNG-REQ message to indicate battery backup mode of operation.

24. The computer program product of claim 19, further comprising control logic means for causing the processor to:
  send an unsolicited grant synchronization extended header to the cable modem termination system and to set a value in unsolicited grant synchronization extended header to indicate battery backup mode of operation.

25. A cable modem, comprising:
  a voltage sensing circuit configured to detect loss of AC power and to switch to a battery backup mode of operation by sending a control signal to switch power supply from AC power to a battery; and
  cable modem processing circuitry configured to notify a cable modem termination system of battery backup mode of operation and to select a single upstream and a single downstream channel for communications with the cable modem termination system prior to receiving instructions from the cable modem termination system to switch to the single upstream and the single downstream channel.

26. The cable modem of claim 25, wherein the cable modem processing circuitry is configured to set a value in a cable modem status (CM-STATUS) message to indicate battery backup mode of operation, to set a value in the CM-STATUS message to indicate the single upstream channel in use and to send the CM-STATUS message to the cable modem termination system.

27. The cable modem of claim 25, wherein the cable modem processing circuitry is configured to send a ranging request (RNG-REQ) message to the cable modem termination system and to set a value in the RNG-REQ message indicating battery backup mode of operation.

28. The cable modem of claim 25, wherein the cable modem processing circuitry is configured to send an unsolicited grant synchronization extended header to the cable modem termination system and to set a value in the unsolicited grant synchronization extended header indicating battery backup mode of operation.

29. The cable modem of claim 25, wherein the cable modem processing circuitry is configured to select the single upstream channel based on whether active voice flows are present on the single upstream channel or based on power levels of the single upstream channel if no active voice flows are present.

30. A cable modem, comprising:
  a processor; and
  a memory in communication with the processor, wherein the memory stores instructions for directing the processor to:
    detect loss of AC power;
    switch to a battery backup mode of operation that uses a single upstream channel and a single downstream channel prior to receiving instructions from a cable modem termination system to switch to the single upstream channel and the single downstream channel; and
    notify a cable modem termination system of the switch to battery backup mode of operation.

31. The cable modem of claim 30, wherein the instructions for directing the processor to switch to the battery backup mode of operation further comprise instructions for directing the processor to:
  use a primary downstream channel for downstream transmissions; and
  select a single upstream channel for upstream transmissions.

32. The cable modem of claim 31, wherein the instructions for directing the processor to select a single upstream channel for upstream transmissions farther comprise instructions for directing the processor to:
  determine whether there is at least one active voice flow present in an upstream channel; and
  if there are no active voice flows present in the upstream channels, select the upstream channel based on channel power levels.

33. The cable modem of claim 31, wherein the memory stores further instructions for directing the processor to:
  detect return of AC power.

34. The method of claim 33, wherein the memory stores further instructions for directing the processor to:
   switch to normal mode of operation.

35. The cable modem of claim 34, wherein the memory stores further instructions for directing the processor to:
   send a message to the cable modem termination system indicating normal mode of operation.

36. The cable modem of claim 30, wherein the instructions for directing the processor to notify a cable modem termination system further comprise instructions for directing the processor to:
   send a cable modem status (CM-STATUS) message to the cable modem termination system and set a first value in the CM-STATUS message to indicate battery backup mode of operation and a second value to indicate an upstream channel used for transmission.

37. The cable modem of claim 30, wherein the instructions for directing the processor to notify a cable modem termination system further comprise instructions for directing the processor to:
   send a ranging request (RNG-REQ) message to the cable modem termination system and setting a value in the RNG-REQ message indicating battery backup mode of operation.

38. The cable modem of claim 30, wherein the instructions for directing the processor to notify a cable modem termination system further comprise instructions for directing the processor to:
   send an unsolicited grant synchronization extended header to the cable modem termination system and setting a value in the unsolicited grant synchronization extended header indicating battery backup mode of operation.

39. A method of operation for a cable modem termination system (CMTS), in response to a power outage of a cable modem coupled to the CMTS, comprising:
   receiving a message from the cable modem; and
   determining, based on the received message, whether the cable modem has lost power and whether the cable modem is in a battery backup mode of operation, wherein in the battery backup mode of operation, the cable modem uses a single upstream channel and a single downstream channel for communication with the CMTS.

40. The method of claim 39, wherein the message is a cable modem status (CM-STATUS) message that has a first value to indicate battery backup mode of operation and a second value to indicate an upstream channel used for transmission.

41. The method of claim 39, wherein the message is a ranging request (RNG-REQ) message that has a value indicating battery backup mode of operation.

42. The method of claim 39, wherein the message is an unsolicited grant synchronization extended header that has a value indicating battery backup mode of operation.

43. The method of claim 39, further comprising:
   determining the upstream channel in use by the cable modem based on the received message; and
   determining whether to change the upstream channel to a different upstream channel.

44. The method of claim 43, further comprising:
   sending a request to the cable modem to change to the different upstream channel if it is determined that the different upstream channel is to be used.

45. The method of claim 44, wherein the request is a Dynamic Bonding Change request (DBC-REQ) message.

46. The method of claim 39, further comprising:
   upon receiving notification of normal power operation, adding or removing upstream and/or a downstream channel and reconfiguring the cable modem.

* * * * *

UNITED STATES PATENT AND TRADEMARK OFFICE
CERTIFICATE OF CORRECTION

PATENT NO. : 8,156,372 B2  
APPLICATION NO. : 12/351452  
DATED : April 10, 2012  
INVENTOR(S) : Lisa Voigt Denney Page 1 of 1

It is certified that error appears in the above-identified patent and that said Letters Patent is hereby corrected as shown below:

Column 16, line 58, "farther" should be replaced with --further--.

Signed and Sealed this
Twenty-ninth Day of May, 2012

David J. Kappos
*Director of the United States Patent and Trademark Office*